United States Patent
Iga

(10) Patent No.: US 12,454,076 B2
(45) Date of Patent: Oct. 28, 2025

(54) SUBSTRATE MANUFACTURING METHOD

(71) Applicant: DISCO CORPORATION, Tokyo (JP)

(72) Inventor: Hayato Iga, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 329 days.

(21) Appl. No.: 17/936,526

(22) Filed: Sep. 29, 2022

(65) Prior Publication Data

US 2023/0112548 A1 Apr. 13, 2023

(30) Foreign Application Priority Data

Oct. 12, 2021 (JP) ................................ 2021-167542

(51) Int. Cl.
*B28D 5/00* (2006.01)
*B23K 26/06* (2014.01)
(Continued)

(52) U.S. Cl.
CPC ........ *B28D 5/0011* (2013.01); *B23K 26/0604* (2013.01); *B23K 26/0676* (2013.01);
(Continued)

(58) Field of Classification Search
CPC ............ B23K 26/0604; B23K 26/0676; B23K 26/53; B23K 26/0652; B23K 2101/40;
(Continued)

(56) References Cited

U.S. PATENT DOCUMENTS 5,628,926 A * 5/1997 Belgacem .............. B23K 26/16
219/121.71
7,919,395 B2 * 4/2011 Morikazu .............. B23K 26/40
438/460
(Continued)

FOREIGN PATENT DOCUMENTS

CN 111986986 A * 11/2020 ............ B23K 26/53
JP 09262826 A 10/1997
(Continued)

OTHER PUBLICATIONS

CN_111986986_A (Year: 2021).*
(Continued)

*Primary Examiner* — Jonathan G Riley
(74) *Attorney, Agent, or Firm* — GREER BURNS & CRAIN, LTD.

(57) ABSTRACT

A substrate manufacturing method of manufacturing a substrate from a workpiece is disclosed. A laser beam is first split and condensed to form a plurality of focal points aligned side by side along a first direction, and with the focal points positioned inside the workpiece, the focal points and the workpiece are moved relative to each other along a second direction orthogonal to the first direction such that a separation layer is formed. A region of the focal points and the workpiece are then moved relative to each other along the first direction. These relative movements are alternately and repeatedly performed. The splitting and condensation of the laser beam are performed such that a volume expansion of the workpiece associated with the formation of the modified regions is relatively small in the vicinity of at least one focal point formed on a center side.

4 Claims, 10 Drawing Sheets

(51) Int. Cl.
*B23K 26/067* (2006.01)
*B23K 26/53* (2014.01)
*B23K 103/00* (2006.01)

(52) U.S. Cl.
CPC ............ *B23K 26/53* (2015.10); *B28D 5/0094* (2013.01); *B23K 2103/56* (2018.08)

(58) Field of Classification Search
CPC . B23K 2103/56; B28D 5/0094; B28D 5/0011
See application file for complete search history.

(56) References Cited

U.S. PATENT DOCUMENTS

| | | | | |
|---|---|---|---|---|
| 2001/0035401 | A1* | 11/2001 | Manor | B28D 1/221 |
| | | | | 219/121.72 |
| 2006/0108338 | A1* | 5/2006 | Nishiwaki | B23K 26/0622 |
| | | | | 219/121.72 |
| 2011/0240611 | A1* | 10/2011 | Sandstrom | G02B 27/42 |
| | | | | 219/121.61 |
| 2011/0244659 | A1* | 10/2011 | Wang | B23K 26/40 |
| | | | | 225/93.5 |
| 2019/0039187 | A1 | 2/2019 | Sekiya | |
| 2021/0031308 | A1 | 2/2021 | Nara | |

FOREIGN PATENT DOCUMENTS

| | | | | |
|---|---|---|---|---|
| JP | 2013521131 | A | 9/2011 | |
| JP | 2019033134 | A | 2/2019 | |
| JP | 2019130538 | A | 8/2019 | |
| JP | 2020074468 | A * | 5/2020 | |
| WO | WO-03076150 | A1 * | 9/2003 | ......... B23K 26/0057 |
| WO | WO-2022233711 | A1 * | 11/2022 | |

OTHER PUBLICATIONS

CN_106216857_B (Year: 2019).*
WO_03076150_A1 (Year: 2003).*
JP_2020074468_A (Year: 2020).*
Office Action issued in counterpart Japanese patent application No. 2021-167542, dated Jun. 3, 2025.

* cited by examiner

SUBSTRATE MANUFACTURING METHOD

BACKGROUND OF THE INVENTION

Field of the Invention

The present invention relates to a substrate manufacturing method of manufacturing a substate from a workpiece having a first surface and a second surface on a side opposite to the first surface.

Description of the Related Art

Chips of semiconductor devices are typically manufactured by use of disc-shaped substrates of a semiconductor material such as silicon (Si) or silicon carbide (SiC). These substrates are each sliced from a cylindrical ingot of the semiconductor material by, for example, a wire saw (see, for example, Japanese Patent Laid-open No. H09-262826).

SUMMARY OF THE INVENTION

When slicing a substrate from an ingot by a wire saw, a slicing margin is around 300 μm, and is hence relatively large. Further, the substrate sliced as described above includes fine irregularities formed on surfaces thereof. Furthermore, the substrate is curved as a whole (a warp is produced in a wafer). The substrate hence needs surface planarization by application of lapping, etching and/or polishing to its surfaces.

Here, the amount of the material to be used finally as substrates is approximately ⅔ of the material amount of the whole ingot. In other words, approximately ⅓ of the material amount of the whole ingot is disposed of when the substrates are sliced from the ingot and planarized. Accordingly, the productivity is low when substrates are manufactured with use of a wire saw as described above.

With the foregoing in view, the present invention has as an object thereof the provision of a substrate manufacturing method which is high in productivity.

In accordance with an aspect of the present invention, there is provided a substrate manufacturing method of manufacturing a substrate from a workpiece having a first surface and a second surface on a side opposite to the first surface. The manufacturing method includes a separation layer forming step of splitting and condensing a laser beam of a wavelength that transmits through a material that makes up the workpiece, to form a plurality of focal points aligned side by side along a first direction parallel to the first surface, and with the focal points positioned inside the workpiece, moving the focal points and the workpiece relative to each other along a second direction orthogonal to the first direction and parallel to the first surface such that, inside the workpiece, a separation layer including a plurality of modified regions formed centering around the respective focal points and cracks propagating from the modified regions is formed, an index feeding step of moving a region in which the focal points are formed and the workpiece relative to each other along the first direction, and a separating step of, after alternately and repeatedly performing the separation layer forming step and the index feeding step, separating the substrate from the workpiece by using the separation layers as starting points. In the separation layer forming step, the laser beam is split and condensed such that, in association with the formation of the modified regions, the workpiece undergoes a relatively small volume expansion in the vicinity of at least one focal point that is among the plurality of focal points and that is formed on a side of a center in the second direction.

In the separation layer forming step, the laser beam may preferably be split and condensed such that a light intensity is relatively low at the at least one focal point that is among the plurality of focal points and that is formed on the side of the center.

In the separation layer forming step, the laser beam may preferably be split and condensed such that a spacing between at least two focal points that are among the plurality of focal points and that are formed on the side of the center is relatively wide.

The workpiece may preferably be an ingot of single crystal silicon.

In the present invention, after the plurality of separation layers are formed inside the workpiece by use of the laser beam of the wavelength that transmits through the material, the substrate is separated from the workpiece by use of these separation layers as the starting points. As a consequence, the productivity of substrates can be improved compared with the case where substrates are manufactured from a workpiece by use of a wire saw.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
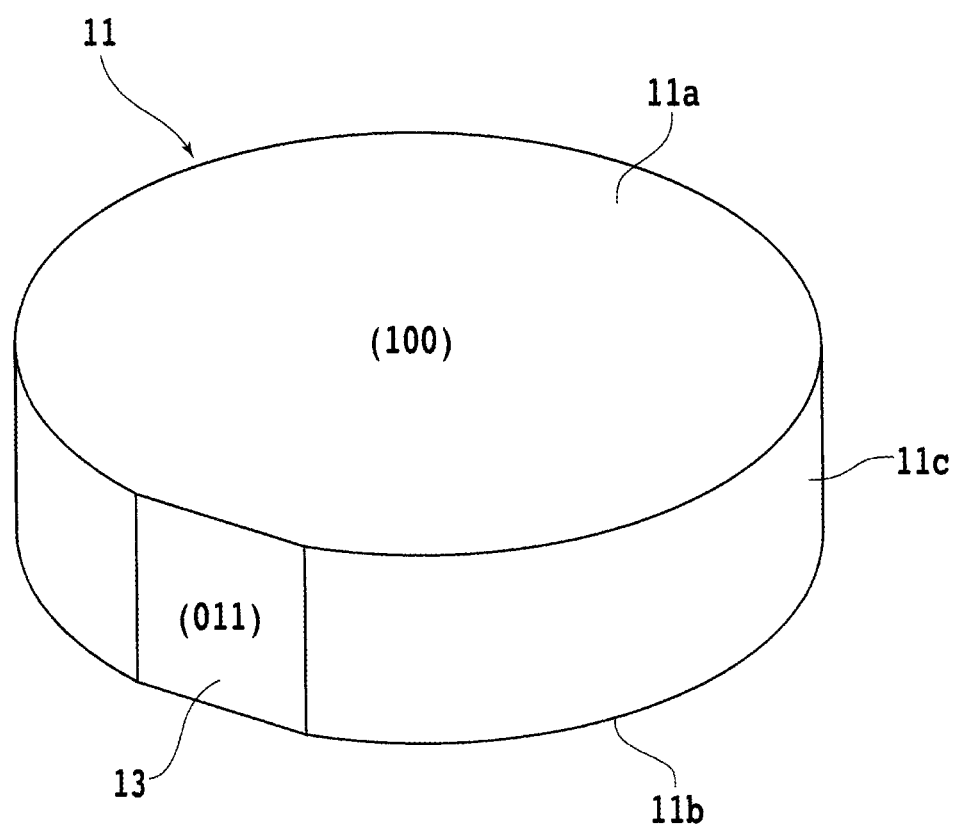
FIG. 1 is a perspective view schematically illustrating an example of an ingot.
Figure 2:
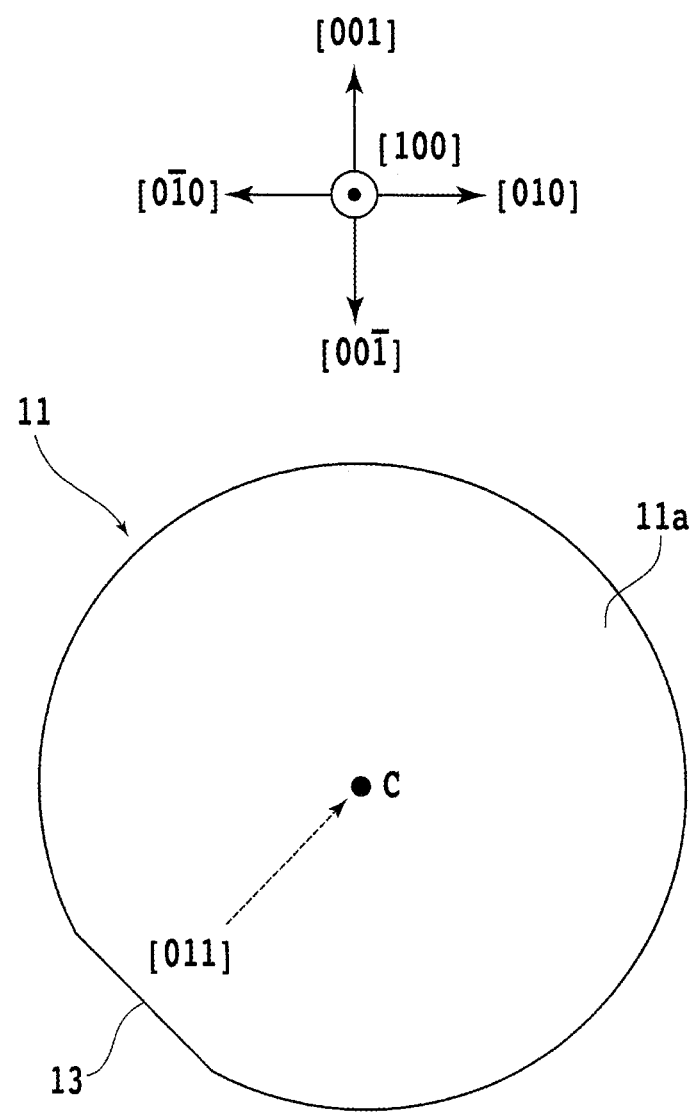
FIG. 2 is a top view schematically illustrating the example of the ingot.

With reference to the attached drawings, a description will be made of an embodiment of the present invention and its modifications. FIG. 1 is a perspective view schematically illustrating an example of an ingot 11 of single crystal silicon, and FIG. 2 is a top view schematically illustrating the example of the ingot 11. In FIG. 1, some crystal planes of the single crystal silicon which are exposed on planes included in the ingot 11 are also indicated. In FIG. 2, some crystal orientations of the single crystal silicon which makes up the ingot 11 are also indicated.

In the ingot 11 illustrated in FIGS. 1 and 2, specific crystal planes (which are here assumed to be (100) crystal plane for the sake of convenience) included in a {100} crystal plane group are exposed on each of a front surface (first surface) 11a and a back surface (second surface) 11b. In other words, vertical line (crystal axis) of the front surface 11a and the back surface 11b each extend along a [100] crystal orientation in the ingot 11.

The ingot 11 is manufactured such that the (100) crystal plane is exposed on each of the front surface 11a and the back surface 11b, but planes slightly tilted from the (100) crystal plane may be exposed on each of the front surface 11a and back surface 11b, due to a processing error or the like at the time of the manufacture. Described specifically, planes that make an angle of 1° or less with respect to the (100) crystal plane may be exposed on each of the front surface 11a and the back surface 11b of the ingot 11. In other words, the ingot 11 may have crystal axis extending along directions that make an angle of 1° or less with respect to the [100] crystal orientation.

Further, an orientation flat 13 is formed in a side surface 11c of the ingot 11, and the ingot 11 has a center C located in a specific crystal orientation (which is here assumed to be a [011] crystal orientation for the sake of convenience) included in a <110> crystal orientation group as seen from the orientation flat 13. At the orientation flat 13, a (011) crystal plane of single crystal silicon is exposed accordingly.

Figure 3:
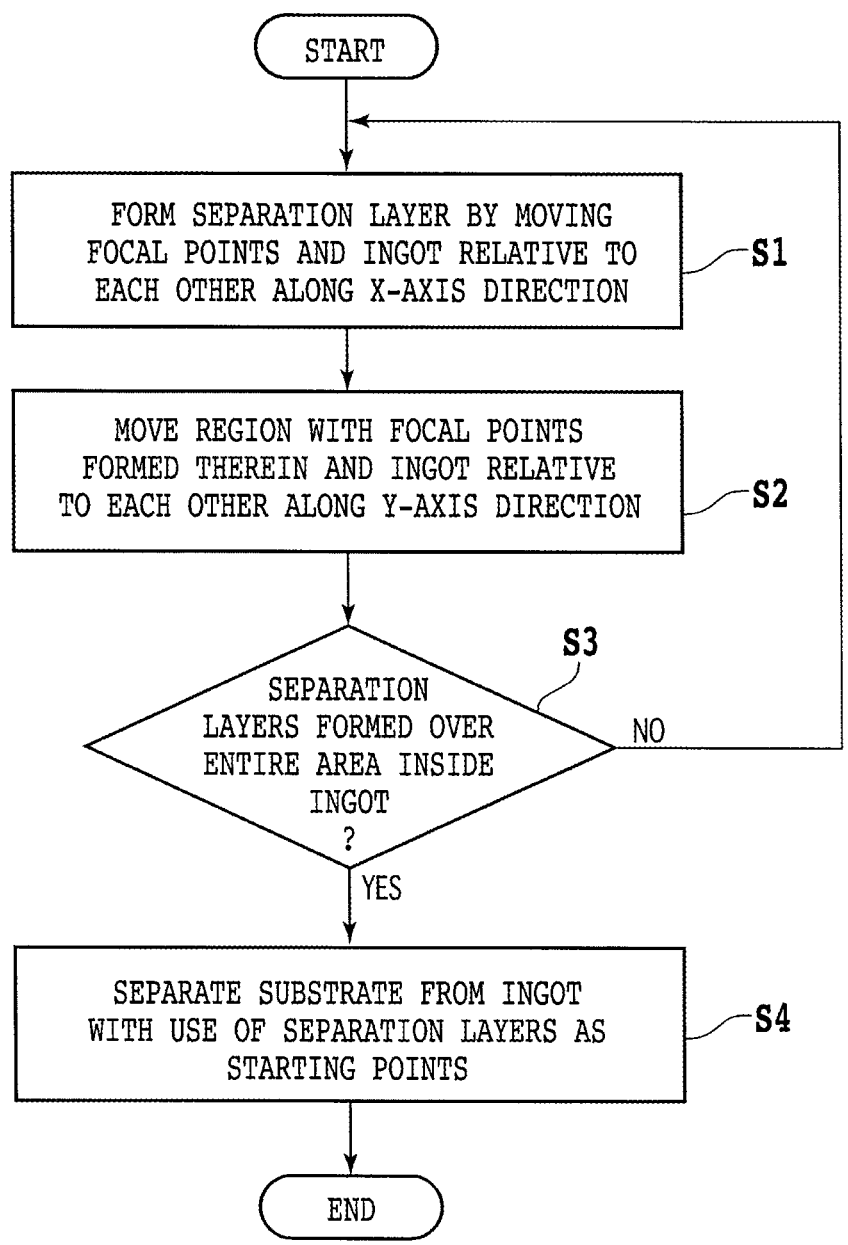
FIG. 3 is a flow chart schematically illustrating a substrate manufacturing method according to an embodiment of the present invention, which manufactures the substrate from the ingot as a workpiece.

FIG. 3 is a flow chart schematically illustrating a substrate manufacturing method according to an embodiment of the present invention, which manufactures the substrate from the ingot 11 as a workpiece. In short, this method forms a plurality of separation layers over an entire area inside the ingot 11 by use of a laser processing apparatus, and then separates the substrate form the ingot 11 with use of the separation layers as starting points.

Figure 4:
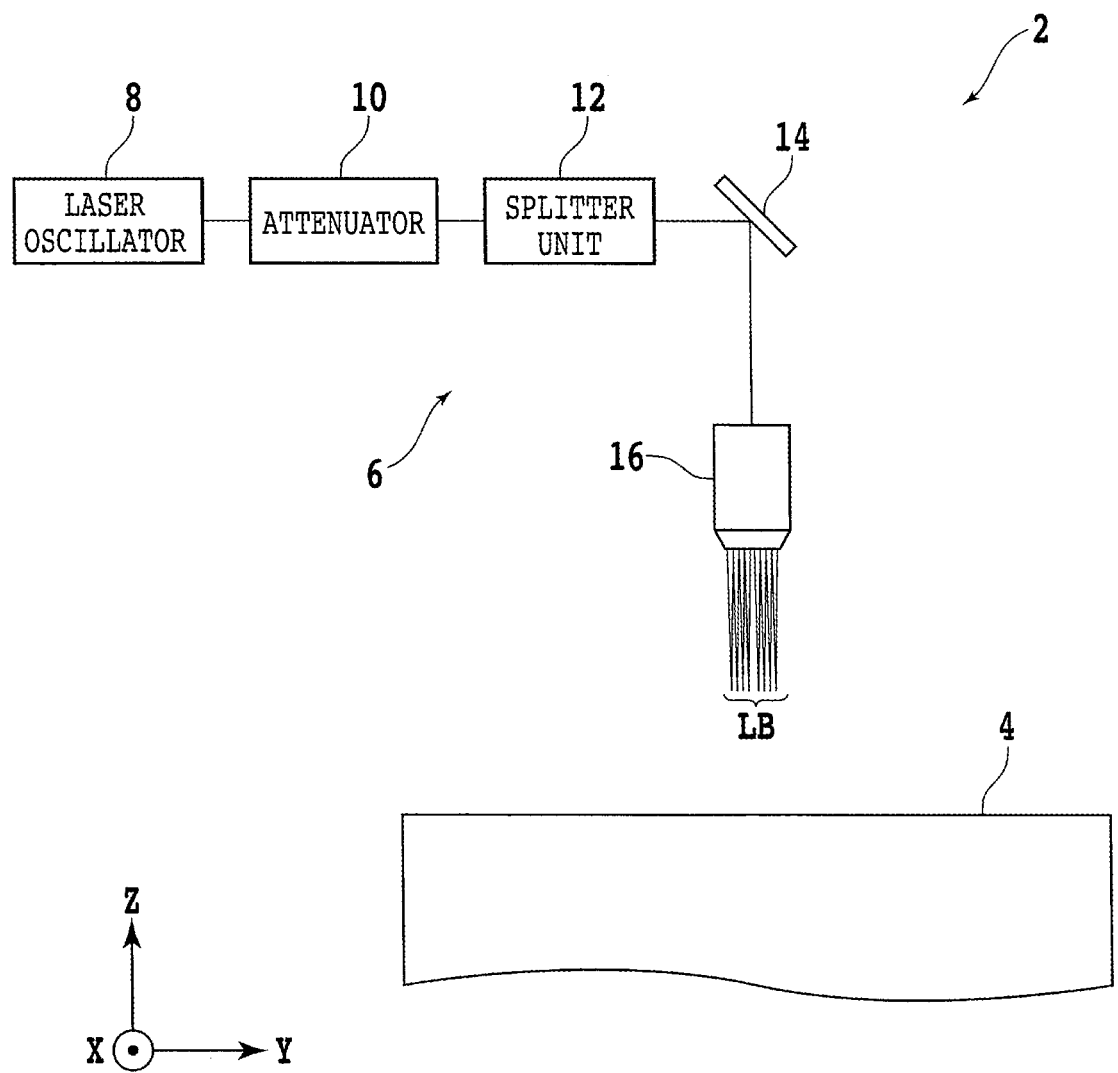
FIG. 4 is a diagram schematically illustrating an example of a laser processing apparatus.

FIG. 4 is a diagram schematically illustrating an example of a laser processing apparatus 2 to be used if the separation layers are to be formed inside the ingot 11. An X-axis direction (second direction) and a Y-axis direction (first direction) indicated in FIG. 4 are directions that are orthogonal to each other on a horizontal plane, while a Z-axis direction also indicated in FIG. 4 is a direction (vertical direction) that is orthogonal to both the X-axis direction and Y-axis direction. In FIG. 4, some of constituent elements of the laser processing apparatus 2 are illustrated as function blocks.

The laser processing apparatus 2 illustrated in FIG. 4 has a disc-shaped holding table 4. The holding table 4 has, for example, a circular upper surface (holding surface) parallel to the X-axis direction and Y-axis direction. The holding table 4 also has a disc-shaped porous plate (not illustrated) including an upper surface exposed in the holding surface.

The porous plate is in communication with a suction source (not illustrated) such as a vacuum pump via a flow channel or the like disposed inside the holding table 4. When this suction source is operated, a negative pressure is produced in a space near the holding surface of the holding table 4. The ingot 11 placed on the holding surface can thus be held on the holding table 4.

Above the holding table 4, a laser beam application unit 6 is disposed. The laser beam application unit 6 has a laser oscillator 8. The laser oscillator 8 has, for example, neodymium-doped yttrium aluminum garnet (Nd:YAG) or the like as a laser medium, and applies a pulsed laser beam LB of a wavelength (for example, 1,064 nm) that transmits through a material (single crystal silicon) making up the ingot 11.

The laser beam LB is adjusted in output power at an attenuator 10, and is then supplied to a splitter unit 12. The splitter unit 12 includes a spatial optical modulator that includes a liquid crystal phase control device generally called a liquid crystal on silicon (LCOS), a diffractive optical element (DOE), and/or the like. The splitter unit 12 splits the laser beam LB such that the laser beam LB applied from a below-mentioned application head 16 forms a plurality of focal points aligned side by side along the Y-axis direction.

For example, the splitter unit 12 splits the laser beam LB such that some of the plurality of focal points that are formed on a side of a center have a relatively wide spacing between themselves. Described specifically, the splitter unit 12 splits the laser beam LB such that a spacing between at least two focal points that are among the plurality of focal points and that are formed on the side of the center is wider than spacings between the remaining focal points formed on both sides of both ends.

For the formation of the plurality of focal points as described above, it is necessary, for example, to split the laser beam LB the output power of which has been adjusted at the attenuator 10 into two laser beams LB, and to further split each of the resulting two laser beams LB into n (n: natural number of 2 or more) rows of laser beams.

The laser beams LB split at the splitter unit 12 are reflected by a mirror 14, and are guided to the application head 16. In the application head 16, condenser lenses (not illustrated) or the like are accommodated to condense the laser beams LB. The laser beams LB condensed through the condenser lenses are then applied to a side of the holding surface of the holding table 4.

The application head 16 of the laser beam application unit 6 is connected to moving mechanisms (not illustrated). These moving mechanisms each include, for example, a ball screw or the like, and move the application head 16 in the X-axis direction, Y-axis direction, and/or Z-axis direction. In the laser processing apparatus 2, the positions (coordinates) in the X-axis direction, Y-axis direction, and Z-axis direction of the focal points of the laser beams LB which are to be applied from the application head 16 can be adjusted by operation of the moving mechanisms.

Figure 5:
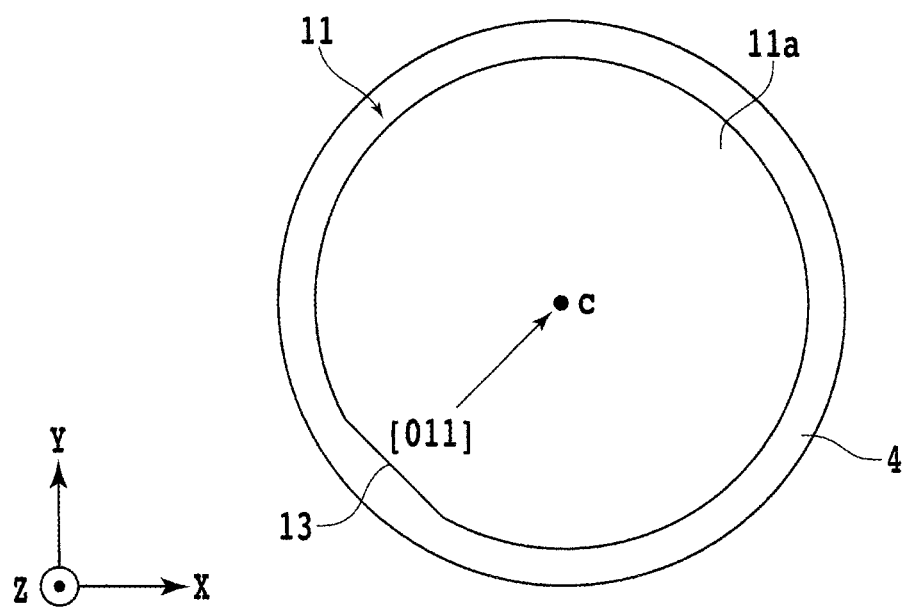
FIG. 5 is a top view schematically illustrating a holding table, which is included in the laser processing apparatus of FIG. 4 and holds the ingot thereon.

When a plurality of separation layers are to be formed over an entire area inside the ingot 11 on the laser processing apparatus 2, the ingot 11 is first held on the holding table 4 with the front surface 11a directed upward. FIG. 5 is a top view schematically illustrating the holding table 4 with the ingot 11 held thereon.

The ingot 11 is held on the holding table 4, for example, in a state where a direction (the [011] crystal orientation)

from the orientation flat 13 toward the center C of the ingot 11 makes an angle of 45° with respect to each of the X-axis direction and Y-axis direction. The ingot 11 is thus held on the holding table 4 in a state where, for example, a [010] crystal orientation is parallel to the X-axis direction and a [001] crystal orientation is parallel to the Y-axis direction.

A separation layer is next formed in a region on a side of one end in the Y-axis direction inside the ingot 11. Described specifically, the application head 16 of the laser beam application unit 6 is first positioned such that the region is positioned in the X-axis direction in plan as seen from the application head 16. The application head 16 is then moved up or down such that the focal points formed by the laser beam LB being split and condensed are positioned at a height corresponding to an inside of the ingot 11.

Figure 6A:
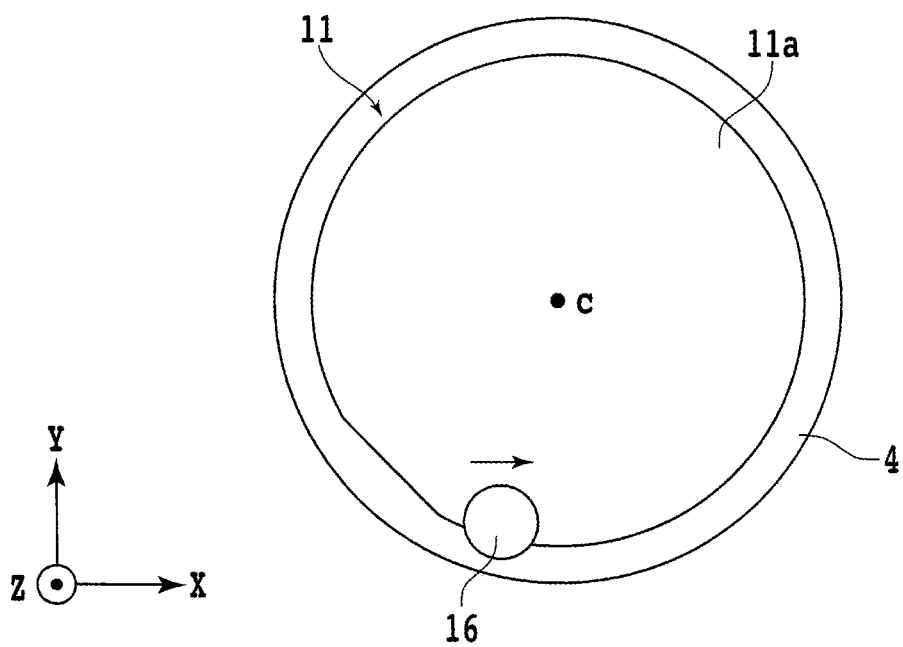
FIG. 6A is a top view schematically illustrating how an example of a separation layer forming step is performed.
Figure 6B:
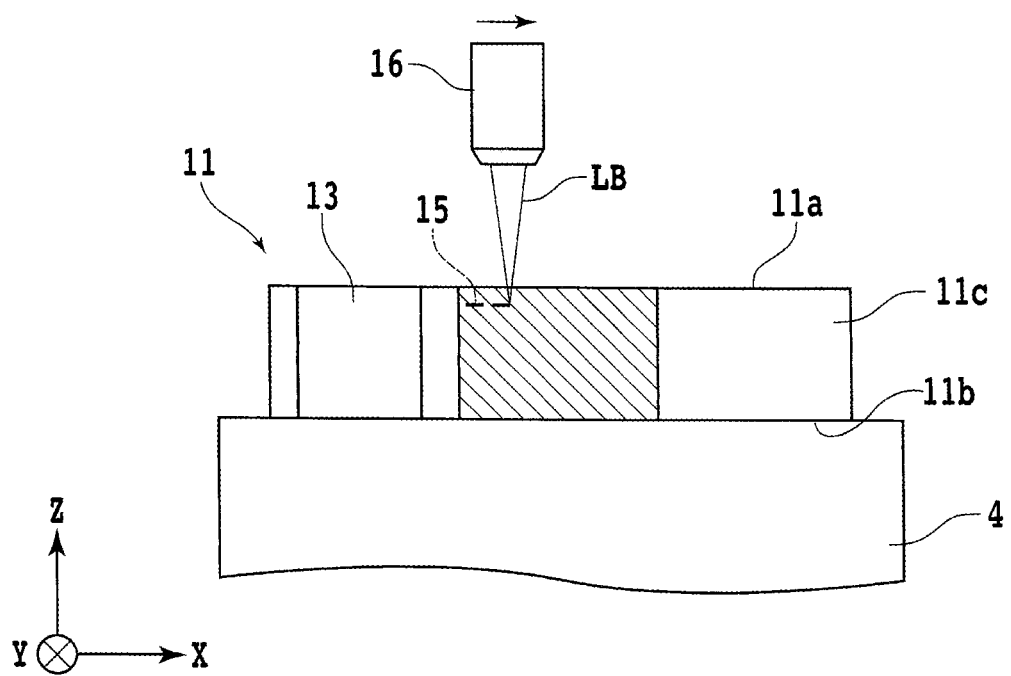
FIG. 6B is a partly cross-sectional side view schematically illustrating how the example of the separation layer forming step is performed.
Figure 7:
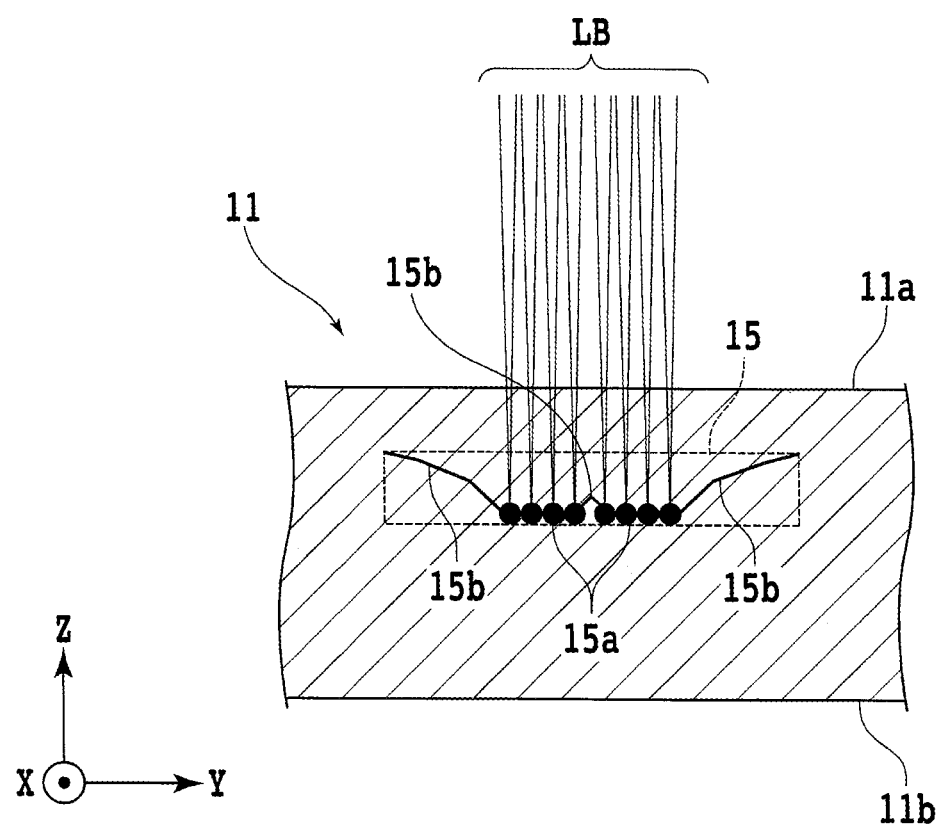
FIG. 7 is a fragmentary cross-sectional view schematically illustrating an example of a separation layer formed inside the ingot in the separation layer forming step.

The separation layer is next formed by the focal points and the ingot 11 being moved relative to each other along the X-axis direction (separation layer forming step: S1). FIG. 6A is a top view schematically illustrating how an example of the separation layer forming step (S1) is performed, and FIG. 6B is a partly cross-sectional side view schematically illustrating how the example of the separation layer forming step (S1) is performed. Further, FIG. 7 is a fragmentary cross-sectional view schematically illustrating an example of a separation layer formed inside the ingot 11 in the separation layer forming step (S1).

In this separation layer forming step (S1), the application head 16 is moved to pass from one end to the other end of the ingot 11 in the X-axis direction in plan view while applying the split and condensed laser beams LB toward the holding table 4 (see FIGS. 6A and 6B).

As a consequence, with the focal points positioned inside the ingot 11, the focal points and the ingot 11 are moved relative to each other along the X-axis direction. The laser beam LB is split and condensed such that, for example, eight focal points are formed and the spacing between two focal points that are among the plurality of focal points and that are formed on the side of the center is relatively wide (see FIG. 7).

The spacing between the two focal points that are among the eight focal points of the split and condensed laser beams LB and that are formed in a pair on the side of the center is thus wider than the spacing between each adjacent pair of the remaining three focal points formed on the one side and the spacing between each adjacent pair of the remaining three focal points formed on the other side.

As a result of the application of the split and condensed laser beams LB, modified regions 15a disturbed in the crystal structure of the single crystal silicon are formed in a manner centering around the respective focal points inside the ingot 11. Accompanied with the formation of the modified regions 15a, the volume of the ingot 11 expands. This volume expansion of the ingot 11 is relatively smaller in vicinities of the two focal points formed with the wide spacing therebetween on the side of the center.

Accompanied with the formation of the modified regions 15a, an internal stress is also produced in the ingot 11. In the ingot 11, cracks 15b then propagate from the modified regions 15a, whereby the internal stress is relaxed. As a result, inside the ingot 11, a separation layer 15 containing the modified regions 15a formed centering around the respective focal points and the cracks 15b propagating from the respective modified regions 15a is formed.

A region in which the focal points are formed and the ingot 11 are then moved relative to each other along the Y-axis direction (index feeding step S2). Described specifically, the application head 16 is moved along the Y-axis direction such that the application head 16 has a moving distance (index) longer than the width along the Y-axis direction of the separation layer 15. The above-mentioned separation layer forming step (S1) is next performed again.

As a result, two separation layers 15 which are apart from each other in the Y-axis direction and are parallel to each other are formed inside the ingot 11. Further, the index feeding step (S2) and the separation layer forming step (S1) are alternately and repeatedly performed until a plurality of separation layers 15 are formed in a remaining region on the side of the other end in the Y-axis direction inside the ingot 11.

In other words, the separation layer forming step (S1) and the index feeding step (S2) are alternately and repeatedly performed such that the plurality of separation layers 15 are formed in a manner ranging from the region on the side of the one end to the region on the side of the other end in the Y-axis direction (over the entire area) inside the ingot 11. If the separation layers 15 have been formed over the entire area inside the ingot 11 (step (S3): YES), the substrate is separated from the ingot 11 with use of the separation layers 15 as starting points (separating step: S4).

Figure 8A:
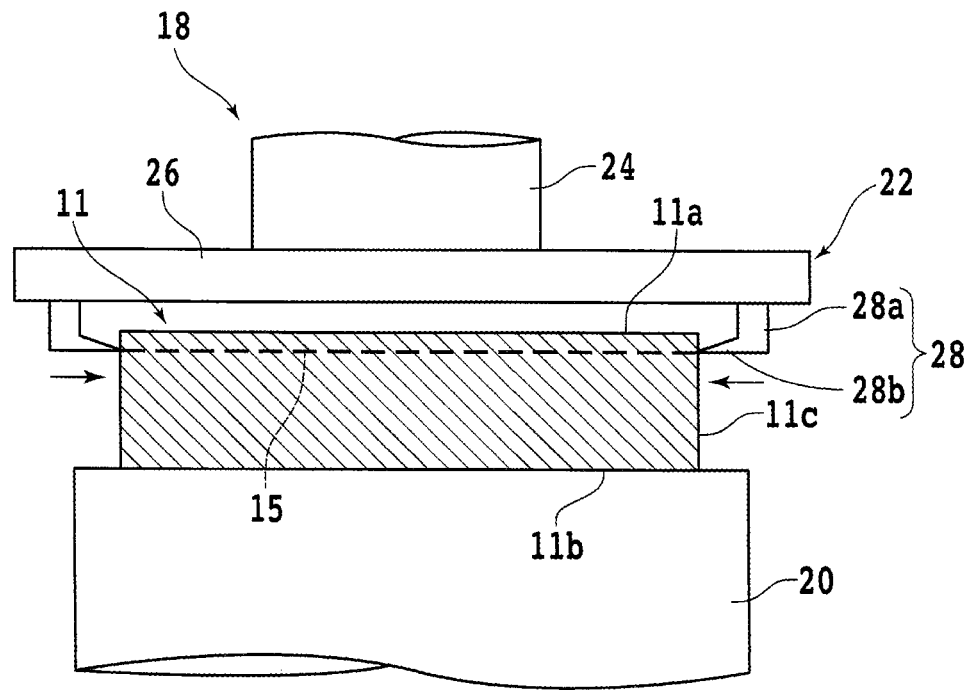
FIG. 8A is a partly cross-sectional side view schematically illustrating how an example of a separating step is performed in a stage.
Figure 8B:
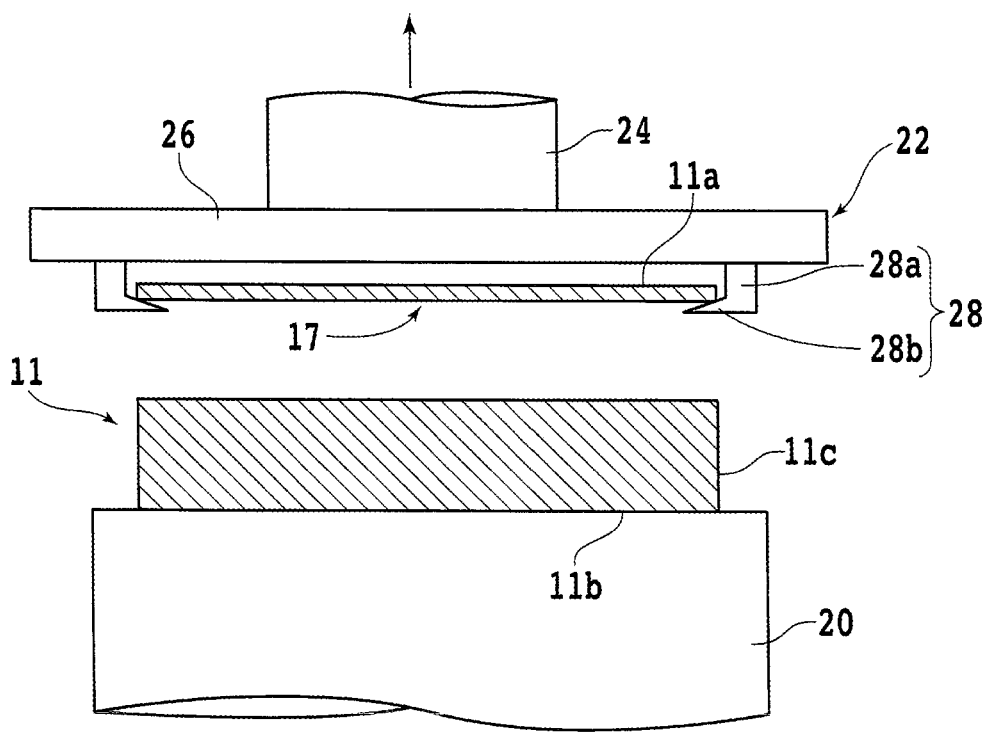
FIG. 8B is a partly cross-sectional side view schematically illustrating how the example of the separating step is performed in another stage.

FIGS. 8A and 8B are partly cross-sectional side views each schematically illustrating how an example of the separating step (S4) is performed in different stages. This separating step (S4) is performed, for example, on a separation apparatus 18 illustrated in FIGS. 8A and 8B. The separation apparatus 18 has a holding table 20 that holds the ingot 11 with the separation layers 15 formed therein.

The holding table 20 has a circular upper surface (holding surface), and a porous plate (not illustrated) is exposed in the holding surface. This porous plate is in communication with a suction source (not illustrated) such as a vacuum pump via a flow channel or the like disposed inside the holding table 20. When this suction source is operated, a negative pressure is produced in a space near the holding surface of the holding table 20.

Above the holding table 20, a separation unit 22 is also disposed. The separation unit 22 has a cylindrical support member 24. To an upper portion of the support member 24, a lift mechanism (not illustrated) of, for example, the ball screw type and a rotary drive source such as a motor are connected. By this lift mechanism being operated, the separation unit 22 is moved up or down. By the rotary drive source being operated, the support member 24 is rotated about a straight line that, as an axis of rotation, extends through a center of the support member 24 and along a direction vertical to the holding surface of the holding table 20.

A lower end portion of the support member 24, on the other hand, is centrally fixed on an upper portion of a disc-shaped base 26. On a lower side of an outer peripheral region of the base 26, movable members 28 are arranged at substantially equal intervals along a peripheral direction of the base 26. The movable members 28 each have a strip-shaped pendant arm portion 28a that downwardly extends from a lower surface of the base 26.

Each pendant arm portion 28a is connected at an upper end portion thereof to an actuator such as an air cylinder incorporated in the base 26, and by the actuator being operated, the corresponding movable member 28 is moved along a radial direction of the base 26. On an inner side wall of a lower end portion of each pendant arm portion 28a, a strip-shaped wedge portion 28b is disposed to extend toward a center of the base 26. The wedge portion 28b is progressively reduced in thickness toward a distal end thereof.

On the separation apparatus 18, the separating step (S4) is performed, for example, in the following order. Described specifically, the ingot 11 is first placed on the holding table 20 such that a center of the back surface 11b of the ingot 11 in which the separation layers 15 have been formed and a center of the holding surface of the holding table 20 are brought into registration with each other.

The suction source which is in communication with the porous plate exposed in the holding surface is then operated such that the ingot 11 is held on the holding table 20. The actuators are then operated such that the movable members 28 are each positioned radially outside the base 26.

The lift mechanism is then operated such that the distal ends of the wedge portions 28b of the individual movable members 28 are positioned at a height corresponding to the separation layers 15 formed inside the ingot 11. The actuators are next operated such that the wedge portions 28b are driven into the side surface 11c of the ingot 11 (see FIG. 8A). The rotary drive source is then operated such that the wedge portions 28b driven into the side surface 11c of the ingot 11 are rotated.

The lift mechanism is next operated to lift the wedge portions 28b (see FIG. 8B). By the wedge portions 28b being driven into the side surface 11c of the ingot 11, rotated, and then lifted as described above, the cracks 15b contained in the separation layers 15 are allowed to propagate further. As a result, the ingot 11 is separated between the side of the front surface 11a and the side of the back surface 11b. The substrate 17 is thus manufactured from the ingot 11 with use of the separation layers 15 as starting points.

A region (or an area) in which the focal points are formed and the ingot 11 are then moved relative to each other along the Y-axis direction (index feeding step S2). Described specifically, the application head 16 is moved along the Y-axis direction such that the application head 16 has a moving distance (index) longer than the width along the Y-axis direction of the separation layer 15. The above-mentioned separation layer forming step (SI) is next performed again.

In the above-mentioned substrate manufacturing method, the separation layers 15 are formed inside the ingot 11 with use of the laser beam LB of the wavelength that transmits through the material (single crystal silicon) making up the ingot 11, and a substrate 17 is then separated from the ingot 11 with use of the separation layers 15 as starting points. As a consequence, compared with the case where substrates 17 are manufactured from the ingot 11 by a wire saw, the amount of the material to be disposed of upon manufacture of such substrates 17 from the ingot 11 can be decreased, thereby enabling the productivity of the substrates 17 to improve.

When the laser beam LB is split and condensed to form the plurality of modified regions 15a, the volume of the ingot 11 expands in association with the formation of the individual modified regions 15a. Here, the cracks 15b are prone to propagate out from some of the modified regions 15a which are located on a side of a center, in directions where no modified region 15a is present.

If the modified regions 15a are formed side by side along the X-axis direction and Y-axis direction, for example, cracks are prone to propagate, with a large component in the Z-axis direction, from such modified regions 15a that are among the plurality of modified regions 15a and that are located on the side of the center. The propagation of the cracks which have the large component in the Z-axis direction from the separation layers 15 however leads to an increase in the amount of the material to be disposed of upon planarization of the substrate 17 manufactured from the ingot 11 and planarization of the ingot 11 before manufacturing each additional substrate 17 from the ingot 11. If this is the case, the productivity of the substrates 17 may decrease accordingly.

In the above-mentioned substrate manufacturing method, on the other hand, the plurality of modified regions 15a are formed such that the spacing between some modified regions 15a, specifically the two modified regions 15a formed on the side of the center, that are among the plurality of modified regions 15a is relatively wide (is wider than the spacings between adjacent ones of the remaining modified regions 15a formed on both sides of both ends). As a consequence, the volume expansion of the ingot 11 associated with the formation of the modified regions 15a is relatively small in the vicinities of the two focal points that are among the plurality of focal points and that are formed on the side of the center.

In this case, it is possible to suppress increases in the components in the Z-axis direction of the cracks 15b that propagate from the two modified regions 15a that are among the plurality of modified regions 15a and that are formed on the side of the center. As a result, according to the above-mentioned substrate manufacturing method, the amount of the material to be disposed of upon manufacture of such substrates 17 from the ingot 11 can be further decreased, thereby enabling the productivity of the substrates 17 to further improve.

In the above-mentioned substrate manufacturing method, each separation layer 15 is formed by the plurality of focal points which are aligned side by side along the Y-axis direction ([001] crystal orientation) and the ingot 11 being moved relative to each other along the X-axis direction ([010] crystal orientation). In this case, the amount of the material to be disposed of upon manufacture of such substrates 17 from the ingot 11 can be decreased still further, thereby enabling the productivity of the substrates 17 to still further improve.

A detailed description will hereinafter be made on this point. First, single crystal silicon is typically most prone to cleavage in specific crystal planes included in the {111} crystal plane group and second most prone to cleavage in specific crystal planes included in the {110} crystal plane group. When modified regions are formed, for example, along a specific crystal orientation (e.g., [011] crystal orientation) included in the <110>crystal orientation group of single crystal silicon that makes up the ingot 11, cracks abundantly occur in a manner propagating from the modified regions and along specific crystal planes included in the {111} crystal plane group.

If, in regions along a specific crystal orientation included in the <100>crystal orientation group of single crystal silicon, modified regions are formed side by side along a direction orthogonal in plan view to the direction in which the regions extend, on the other hand, cracks abundantly occur in a manner propagating from the individual modified regions along specific crystal planes parallel to the direction in which the regions extend, in an {N10} (N: natural number of 10 or less) crystal plane group.

If, in regions along the [010] crystal orientation, for example, modified regions 15a are formed side by side along the [001] crystal orientation as in the above-mentioned substrate manufacturing method, cracks abundantly occur in a manner propagating from the individual modified regions 15a along specific crystal planes which are parallel to the [010] crystal orientation, in the {N10} (N: natural number of 10 or less) crystal plane group.

Described specifically, if the modified regions 15a are formed as described above, cracks are prone to propagate in the following crystal planes:

$$(101),(201),(301),(401),(501),(601),(701),(801),(901),\\(10\underline{0}1) \quad [\text{Math. 1}]$$

$$(\bar{1}01),(\bar{2}01),(\bar{3}01),(\bar{4}01),(\bar{5}04(\bar{6}01),(\bar{7}01),(\bar{8}01),(\bar{9}01),(\\\overline{10}01) \quad [\text{Math. 2}]$$

The (100) crystal plane exposed on the front surface 11a and back surface 11b of the ingot 11 makes an angle of 45° or less with respect to the specific crystal planes which are parallel to the crystal orientation, in the {N10} crystal plane group. With respect to the specific crystal planes included in the {111} crystal plane group, on the other hand, the (100) crystal plane makes an angle of approximately 54.7°.

In the above-mentioned substrate manufacturing method, the separation layers 15 tend to become wide and thin compared with the case in which, in the regions along the [011] crystal orientation of single crystal silicon, the modified regions are formed side by side along the direction orthogonal in plan view to the direction in which the regions extend. As a result, according to the above-mentioned substrate manufacturing method, the amount of the material to be disposed of upon manufacture of such substrates 17 from the ingot 11 can be decreased even still further, thereby enabling the productivity of the substrates 17 to improve even still further.

It is to be noted that the above-mentioned substrate manufacturing method is an embodiment of the aspect of the present invention and the present invention should hence not be limited to the above-mentioned method. For example, the ingot to be used for the manufacture of the substrate in the present invention should not be limited to the ingot 11 illustrated in FIG. 1, FIG. 2, and so on. Described specifically, in the present invention, a substrate may be manufactured from an ingot of single crystal silicon, in which crystal planes not included in the {100} crystal plane group are exposed on each of the front surface and back surface.

In the present invention, a substrate may also be manufactured from an ingot with a notch formed in a side surface thereof. As a further alternative in the present invention, a substrate may also be manufactured from an ingot in which neither an orientation flat nor a notch is formed in a side surface thereof. As a still further alternative in the present invention, a substrate may also be manufactured from an ingot of a semiconductor material other than silicon, such as silicon carbide.

It is also to be noted that the construction of the laser processing apparatus for use in the present invention should not be limited to the construction of the above-mentioned laser processing apparatus 2. The present invention may be practiced using, for example, a laser processing apparatus in which moving mechanisms are arranged to move the holding table 4 along each of the X-axis direction, Y-axis direction and/or Z-axis direction.

Described in short, insofar as the holding table 4 which holds the ingot 11 thereon and the application head 16 of the laser beam application unit 6 which condenses and applies the split laser beams LB can be moved relative to each other along the X-axis direction, Y-axis direction, or Z-axis direction, no limitations are imposed on the construction for the movements in the present invention.

Further, insofar as increases in the components in the Z-axis direction of the cracks 15b that propagate from the two modified regions 15a that are among the plurality of modified regions 15a and that are formed on the side of the center can be suppressed, no limitations are imposed on the manner of splitting of the laser beam LB for the suppression in the separation layer forming step (S1) in the present invention. In other words, the separation layer forming step (S1) in the present invention is required to split and condense the laser beam LB such that the volume expansion of the ingot 11 in association with the formation of the modified regions 15a is relatively small in the vicinities of the two focal points that are among the plurality of focal points and that are formed on the side of the center.

Figure 9:
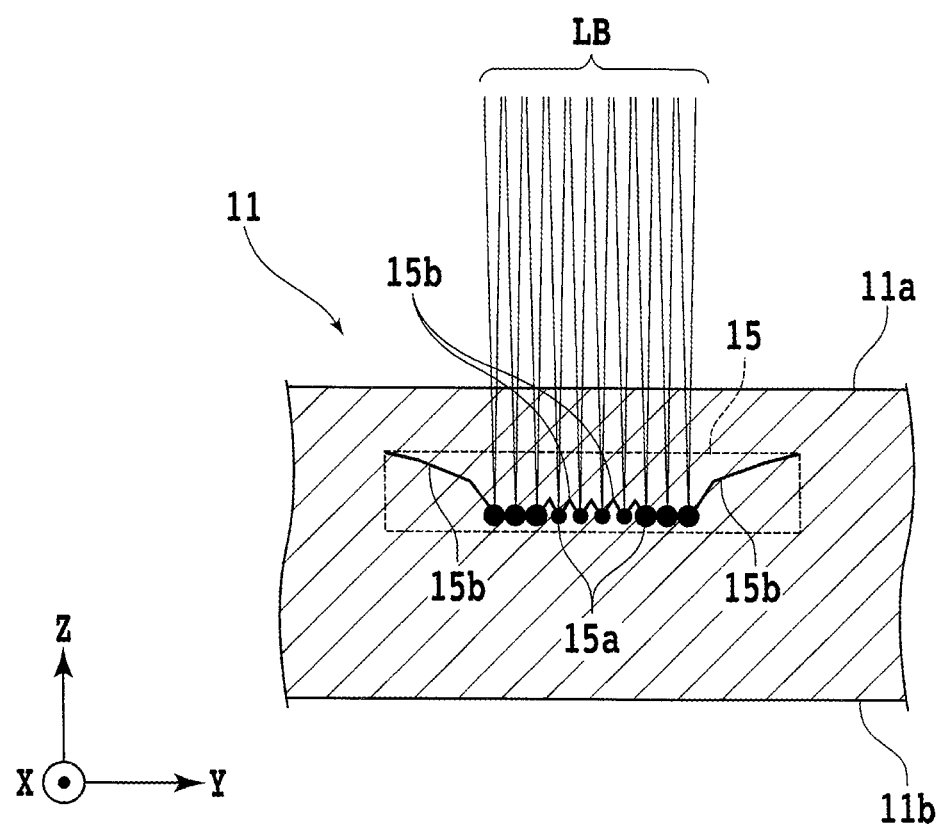
FIG. 9 is a fragmentary cross-sectional view schematically illustrating a modification of the separation layer formed inside the ingot in the separation layer forming step.

In the separation layer forming step (S1) in the present invention, the laser beam LB may be split and condensed, for example, such that a light intensity is relatively low at some focal points that are among a plurality of focal points and that are formed on the side of the center. FIG. 9 is a fragmentary cross-sectional view schematically illustrating, as a modification, an example of a separation layer formed inside an ingot 11 in a separation layer forming step that uses laser beams LB split and condensed as described above.

Described specifically, the laser beams LB illustrated in FIG. 9 have been split and condensed such that 10 focal points are formed at equal intervals along the Y-axis direction and the laser beams LB at the four focal points formed on a side of a center have a relatively low light intensity. In other words, the light intensities of the laser beams LB at the individual four focal points that are among the 10 focal points of the laser beams LB and that are formed on the side of the center are lower than the light intensities of the laser beams LB at the individual six focal points formed on both sides of both ends.

As a consequence, the volume expansion of the ingot 11 associated with the formation of 10 modified regions 15a is relatively small in vicinities of the four focal points that are among the 10 focal points and that are formed on the side of the center. In this case, short cracks 15b propagate from four modified regions 15a that are among the 10 modified regions 15a and that are formed on the side of the center.

It is hence possible to suppress increases in the components in the Z-axis direction of the cracks 15b propagating from the four modified regions 15a that are among the 10 modified regions and that are formed on the side of the center. As a result, if the laser beams LB illustrated in FIG. 9 are used in the separation layer forming step (S1) in the present invention, the amount of the material to be disposed of upon manufacture of such substrates 17 (see FIG. 8B) from the ingot 11 can be further decreased, thereby enabling the productivity of the substrates 17 to further improve.

In the separation layer forming step (S1) in the present invention, the laser beam may also be split and condensed such that, at least two focal points that are among the plurality of focal points and that are formed on the side of the center, the light intensity is relatively low and the spacing between themselves is relatively wide.

In the present invention, the separation layer forming step (S1) and the index feeding step (S2) may also be repeatedly performed again after the separation layers 15 have been formed from the region on the side of the one end to the region on the side of the other end in the Y-axis direction (over the entire area) inside the ingot 11 (step S3: YES). Described specifically, ranging from the region on the side of the one end to the region on the side of the other end in the Y-axis direction inside the ingot 11 in which the separation layers 15 have already been formed, the application of laser beams LB may be performed again to form augmenting separation layers 15.

In the present invention, the separation layer forming step (S1) may also be performed again after the separation layer forming step (S1) but before the index feeding step (S2). Described specifically, the application of laser beams LB may be performed again to form augmenting separation layers 15 in a linear region in which the separation layers 15 have already been formed inside the ingot 11.

The repeated performance of the separation layer forming step (S1) to the regions where the separation layers 15 have already been formed leads to increases in the densities of both the modified regions 15a and the cracks 15b contained in the already-formed separation layers 15. As a consequence, the separation of the substrate 17 from the ingot 11 in the separating step (S4) is facilitated.

In this case, the cracks 15b contained in the separation layers 15 further propagate and have longer lengths (greater widths) along the Y-axis direction in the separation layers 15. The moving distance (index) of the application head 16 of the laser beam application unit 6 in the index feeding step (S2) can thus be made longer in this case.

If the cracks 15b contained in the separation layers 15 are also allowed to propagate in the separating step (S4) of the present invention, it may be unnecessary to form the separation layers 15 over the entire area inside the ingot 11 in the separation layer forming step (S1). If the cracks 15b are allowed to propagate to regions near the side surface 11c of the ingot 11 by the separating step (S4) being performed on the separation apparatus 18, for example, it may be unnecessary to form the separation layers 15 in some or all of the regions near the side surface 11c of the ingot 11 in the separation layer forming step (S1).

Figure 10A:
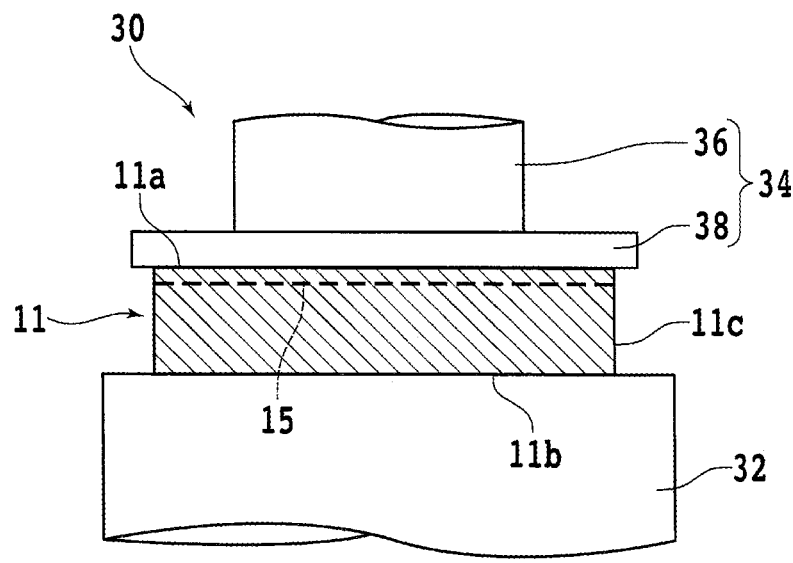
FIG. 10A is a partly cross-sectional side view schematically illustrating how a modification of the separating step is performed in a stage.
Figure 10B:
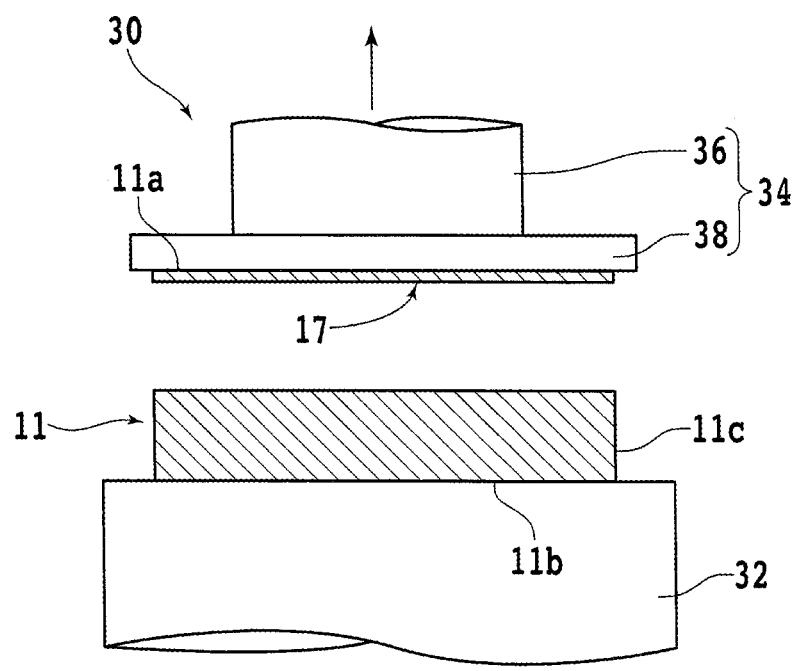
FIG. 10B is a partly cross-sectional side view schematically illustrating how the modification of the separating step is performed in another stage.

Further, the separating step (S4) in this invention may also be performed using an apparatus other than the separation apparatus 18 illustrated in FIGS. 8A and 8B. FIGS. 10A and 10B are partly cross-sectional side views schematically illustrating another example of the separating step (S4) which is performed using a separation apparatus 30 other than the separation apparatus 18, at different stages.

The separation apparatus 30 illustrated in FIGS. 10A and 10B has a holding table 32 that holds the ingot 11 with the separation layers 15 formed therein. The holding table 32 has a circular upper surface (holding surface), and a porous plate (not illustrated) is exposed in the holding surface.

This porous plate is in communication with a suction source (not illustrated) such as a vacuum pump via a flow channel or the like disposed inside the holding table 32. When this suction source is operated, a negative pressure is thus produced in a space near the holding surface of the holding table 32.

Above the holding table 32, a separation unit 34 is also disposed. The separation unit 34 has a cylindrical support member 36. To an upper portion of the support member 36, a lift mechanism (not illustrated) of, for example, the ball screw type is connected. By this lift mechanism being operated, the separation unit 34 is moved up or down.

A lower end portion of the support member 36, on the other hand, is centrally fixed on an upper portion of a disc-shaped suction plate 38. Through a lower surface of the suction plate 38, a plurality of suction openings are formed, and these suction openings are each in communication with a suction source (not illustrated) such as a vacuum pump via a flow channel or the like disposed inside the suction plate 38. When this suction source is operated, a negative pressure is thus produced in a space near the lower surface of the suction plate 38.

On the separation apparatus 30, the separating step (S4) is performed, for example, in the following order. Described specifically, the ingot 11 with the separation layers 15 formed therein is first placed on the holding table 32 such that a center of the back surface 11b of the ingot 11 and a center of the holding surface of the holding table 32 are brought into registration with each other.

The suction source which is in communication with the porous plate exposed in the holding surface is then operated such that the ingot 11 is held on the holding table 32. The lift mechanism is next operated to move the separation unit 34 downward such that the lower surface of the suction plate 38 is brought into contact with the front surface 11a of the ingot 11.

The suction source which is in communication with the suction openings formed in the suction plate 38 is then operated such that the ingot 11 is sucked on the side of the front surface 11a thereof via the suction openings (see FIG. 10A). The lift mechanism is next operated to move the separation unit 34 upward such that the suction plate 38 is moved apart from the holding table 32 (see FIG. 10B).

At this time, an upward force acts on the side of the front surface 11a of the ingot 11 sucked on the side of the front surface 11a thereof via the suction openings formed in the suction plate 38. As a result, the cracks 15b contained in the separation layers 15 are allowed to further propagate, whereby the ingot 11 is separated between the side of the front surface 11a and the side of the back surface 11b. With the separation layers 15 used as starting points, the substrate 17 is thus manufactured from the ingot 11.

In the separating step (S4) in the present invention, ultrasonic waves may be applied to the side of the front surface 11a of the ingot 11 prior to the separation of the ingot 11 between the side of the front surface 11a and the side of the back surface 11b. If this is the case, the cracks 15b contained in the separation layers 15 are allowed to further propagate, thereby facilitating the separation of the ingot 11 between the side of the front surface 11a and the side of the back surface 11b.

In the present invention, the front surface 11a of the ingot 11 may be planarized by grinding or polishing before the separation layer forming step (S1) (planarizing step). This planarization may be performed, for example, when manufacturing a plurality of substrates 17 from the ingot 11. Described specifically, after the substrate 17 has been manufactured by the separation of the ingot 11 at the separation layers 15, irregularities reflecting the distribution of the modified regions 15a and cracks 15b contained in the separation layers 15 are formed on a newly exposed surface of the ingot 11.

If a new substrate 17 is to be manufactured from the ingot 11, it is hence preferred to planarize the surface of the ingot 11 before the separation layer forming step (S1). As a consequence, the laser beams LB applied to the ingot 11 in the separation layer forming step (S1) can be suppressed from diffused reflection on the surface of the ingot 11. In the present invention, the substrate 17 separated from the ingot 11 may also be planarized by grinding or polishing at its surface on the side of the separation layer 15.

In the present invention, a substrate may also be manufactured using, as a workpiece, a bare wafer of a semiconductor material such as silicon or silicon carbide. This bare wafer has a thickness of, for example, twice to 5 times as large as the substrate to be manufactured. This bare wafer is in turn manufactured, for example, through separation from an ingot of a semiconductor material such as silicon or silicon carbide by a similar method as the above-mentioned method. In this case, the substrate can be expressed as being manufactured by repeating the above-mentioned method twice.

In the present invention, a substrate may also be manufactured using, as a workpiece, a device ware manufactured by semiconductor devices being formed on one side of such a bare wafer. Besides, the construction, method, and the like which relate to the above-mentioned embodiment can also be practiced with appropriate modifications within the scope of the object of the present invention.

The present invention is not limited to the details of the above described preferred embodiment. The scope of the invention, defined the appended claims and all changes and modifications as fall within the equivalence of the scope of the claims are therefore to be embraced by the invention.

What is claimed is:

1. A substrate manufacturing method of manufacturing a substrate from a workpiece having a first surface and a second surface on a side opposite to the first surface, comprising:
   a separation layer forming step of splitting and condensing a laser beam of a wavelength that transmits through a material that makes up the workpiece, to form a plurality of focal points aligned side by side along a first direction parallel to the first surface, and with the plurality of focal points positioned inside the workpiece, moving the plurality of focal points and the workpiece relative to each other along a second direction orthogonal to the first direction and parallel to the first surface such that, inside the workpiece, a separation layer including a plurality of modified regions formed in a manner centering around the respective plurality of focal points and cracks propagating from the plurality of modified regions is formed;
   an index feeding step of moving an area in which the plurality of focal points are formed and the workpiece relative to each other along the first direction; and
   a separating step of, after performing the separation layer forming step and the index feeding step along the first and second directions, separating the substrate from the workpiece with use of the separation layers as starting points,
   wherein, in the separation layer forming step, the laser beam is split and condensed such that, in association with the formation of the plurality of modified regions, a first volume expansion in a vicinity of at least one focal point that is among the plurality of focal points and that is formed on a side of a center in the second direction is smaller than a second volume expansion in a vicinity of another focal point that is among the plurality of focal points and that is formed on a side of an end in the second direction simultaneously with the formation of the at least one focal point.

2. The substrate manufacturing method according to claim 1, wherein, in the separation layer forming step, the laser beam is split and condensed such that a first light intensity is at the at least one focal point that is among the plurality of focal points and that is formed on the side of the center is lower than a second light intensity at the other focal point that is among the plurality of focal points and that is formed on the side of the end.

3. The substrate manufacturing method according to claim 1, wherein, in the separation layer forming step, the laser beam is split and condensed such that a first spacing between at least two focal points that are among the plurality of focal points and that are formed on the side of the center is wider than a second spacing between another two focal points that are among the plurality of focal points and that are formed on the side of the end.

4. The manufacturing method according to claim 1, wherein the workpiece is an ingot of single crystal silicon.

* * * * *